United States Patent
Jeon et al.

(10) Patent No.: US 7,869,985 B2
(45) Date of Patent: Jan. 11, 2011

(54) 3D VEHICLE SIMULATOR SYSTEM AND SIMULATION METHOD FOR ECU EMBEDDED SYSTEM

(75) Inventors: Jae Wook Jeon, Suwon-si (KR); Suk Hyun Seo, Suwon-si (KR); Sang Won Lee, Suwon-si (KR); Ji Hwan Park, Suwon-si (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 985 days.

(21) Appl. No.: 11/674,845

(22) Filed: Feb. 14, 2007

(65) Prior Publication Data

US 2007/0287135 A1    Dec. 13, 2007

(30) Foreign Application Priority Data

Apr. 20, 2006    (KR) .................. 10-2006-0035596

(51) Int. Cl.
*G06F 7/00*    (2006.01)
(52) U.S. Cl. .................. 703/8; 701/65; 701/71
(58) Field of Classification Search .............. 703/8; 701/65, 71
See application file for complete search history.

(56) References Cited

U.S. PATENT DOCUMENTS

| | | | | |
|---|---|---|---|---|
| 4,866,618 A | * | 9/1989 | Tamura et al. | 701/101 |
| 6,928,362 B2 | * | 8/2005 | Meaney | 701/115 |
| 7,162,389 B2 | * | 1/2007 | Uozumi et al. | 702/182 |
| 7,472,051 B2 | * | 12/2008 | Mariani et al. | 703/13 |
| 7,497,776 B1 | * | 3/2009 | Roman | 463/6 |
| 2002/0029136 A1 | * | 3/2002 | Hagiwara et al. | 703/8 |
| 2005/0159869 A1 | * | 7/2005 | Tohdo et al. | 701/48 |

FOREIGN PATENT DOCUMENTS

| | | |
|---|---|---|
| KR | 1020020054815 A | 7/2002 |
| KR | 10-2003-0086765 A | 11/2003 |
| KR | 10-0411080 B1 | 12/2003 |
| KR | 10-2005-0100412 A | 10/2005 |

* cited by examiner

*Primary Examiner*—Dwin M Craig
(74) *Attorney, Agent, or Firm*—Blakely, Sokoloff, Taylor & Zafman LLP.

(57) ABSTRACT

Disclosed is a 3D vehicle simulator system for an ECU embedded system comprising an external input apparatus 130, to which signals of one or more external sensors are inputted, an ECU embedded system 120 for processing and executing signals inputted form the external input apparatus 130, an external output apparatus 140 for receiving and outputting the output signals of the ECU embedding system 120, a vehicle simulator 110 for calculating at real time the signals inputted from the ECU embedded system 120, and for 3D-modeling and outputting the status of the vehicle, and a display 150 for displaying the 3D-modeled vehicle outputted form the vehicle simulator 110.

13 Claims, 7 Drawing Sheets

3D VEHICLE SIMULATOR SYSTEM AND SIMULATION METHOD FOR ECU EMBEDDED SYSTEM

CROSS-REFERENCE TO RELATED APPLICATION

The present application claims, under 35 U.S.C. §119(a), the benefit of the filing date of Korean Patent Application No. 10-2006-0035596 filed on Apr. 20, 2006, the entire contents of which are hereby incorporated by reference.

BACKGROUND OF THE INVENTION

1. Field of the invention

The present invention relates to a 3D vehicle simulator system for an ECU embedded system, and in particular to a 3D vehicle simulator system for an ECU embedded system, wherein the 3D vehicle simulator system tests stability and suitability of a developed ECU embedded system applied to a virtual 3D vehicle system.

2. Description of the Prior Art

In general, development of a component of a component of a vehicle consists of designing the component, fabricating a prototype product, testing the performance of the fabricated prototype product, and redesigning the component using feedback of testing results.

In particular, a performance test of a mechatronics component of a vehicle is performed through an actual vehicle test which requires a great amount of time and costs.

With such an actual vehicle test, some parts are difficult to measure due to complexity of vehicle dynamics and non-linear elements. In addition, it is impossible to repeatedly perform tests. Moreover, because a tester performing the test may be exposed to danger, a number of restrictions follow the test.

Therefore, in lieu of the actual vehicle test, a vehicle simulator system is used, which allows various tests to be performed on a simulator.

Such a vehicle simulation system is disclosed in Korean Patent Publication Registration No. 10-0411080 published on Dec. 18, 2003.

As shown in FIG. 1, the simulation system of the Korean Patent includes a signal tuning unit 1, the output, signals of which are variable as testing requirements are set by a user so as to simulate input/output signals of a vehicle engine control apparatus, a power separation unit 2 for separating power supplied to an electronic control unit (hereinafter, to be referred to as "ECU") and power supplied to a simulator, making power e independently used so that the hardware of the ECU can be protected and the reliability for the test of the ECU can be maintained, a central processing unit 3 for processing the control signals outputted from the ECU according a set program so as to verify the control logic of the ECU and to judge the reliability of the control logic of the ECU, a signal generation unit 5 for simulating the signals of the ECU according to the output signals from the signal tuning unit 1 and transferring the simulated signals to the central processing unit 5, a signal display unit 7 for displaying the output signals from the ECU so that the user can recognize the output signals, and an ECU connection unit connected to lines so as to exchange signals with the ECU.

The simulation system of the Korean Patent allows the user to precisely judge whether a tested engine control apparatus is normally operated or not by tuning various signals required in the testing procedure without performing an actual vehicle test, thereby reducing the steps involved in developing a vehicle and the costs required for the actual vehicle test.

The above-mentioned simulation system is inputted with data limited to an engine or receives output data according to the input data, thereby presenting a graph on a screen.

As a result, because the above-mentioned simulation system is limited to engine signals, it is difficult to find the entire moving status of a vehicle to which the simulation system is applied, and the data outputted in form of a graph can be read only by a user having expert knowledge of the data.

SUMMARY OF THE INVENTION

Accordingly, the present invention has been made to solve the above-mentioned problems occurring in the prior art, and an object of the present invention is to provide a simulator which implements one vehicle as one system by connecting an ECU embedded system to a virtual vehicle, and outputs the status of the vehicle implemented as one system on a screen as a 3D model, so that any data can be continuously observed.

In order to achieve the above-mentioned object, there is provided a 3D vehicle simulator system for an ECU embedded system including: an external input apparatus, to which signals of one or more external sensors are inputted; an ECU embedded system processing and executing signals inputted from the external input apparatus; an external output apparatus for receiving and outputting the output signals of the ECU embedded system; a vehicle simulator for calculating in real time the signals inputted from the ECU embedded system and 3D-modeling and outputting the status of the vehicle; and a display for displaying the 3D-modeled vehicle outputted from the vehicle simulator.

The ECU embedded system preferable includes at least a 32-bit microcontroller unit.

The vehicle simulator may include: a status processing algorithm operation unit for estimating the present status through an algorithm programmed to be suitable for a vehicle simulation model by inputting signals outputted from the ECU embedded system; a status storage unit for storing the present status and a prior status which have passed the status processing algorithm unit, and data required for estimating the next status; and a 3D model rendering engine for receiving the present status stored in the status storage unit and outputting a 3D model.

For communicating signals between the ECU embedded system and the vehicle simulator, and for transmitting signals from the ECU embedded system to the external output apparatus, CAN (Controller Area Network) network communication protocol may be used.

Alternatively, for communicating signals between the ECU embedded system and the vehicle simulator and transmitting signals from the ECU embedded system to the external output apparatus, RS-232 network communication protocol may be used.

At least one presentation of data may be displayed in real time on the display.

Assuming that the engine power calculated by the status processing algorithm unit is "F," and the loss of engine power caused by parameters of a road surface's condition is "b", the actual engine power "Fr" by the status processing algorithm unit is calculated as "F−b" in the vehicle simulator.

Assuming that the weight of the vehicle is "m," the present acceleration "A" calculated by the status processing algorithm unit is calculated as 'F−b'/m in the vehicle simulator.

According to another aspect of the present invention, there is provided a 3D vehicle simulation method for an ECU embedded system comprising steps of: initializing a vehicle simulator; transmitting data from an external input apparatus to an ECU embedded system; transmitting data from the ECU embedded to an external output apparatus; loading a prior status from a status storage unit in the vehicle simulator; calculating the present status, the calculation being performed by a status processing algorithm operation unit in the vehicle simulator by using the prior status and the data transmitted from the ECU embedded system; storing the present status calculated by the status algorithm operation unit in the status storage unit; outputting the vehicle of the present status in a 3D model, the outputting of 3D model being performed by a 3D model rendering engine in the vehicle simulator by using the present status stored in the status storage unit; and displaying the 3D model vehicle on a display.

The inventive method may further include retransmitting signals to be outputted to the external output apparatus after subjecting a simulation procedure in the vehicle simulator to the ECU embedded system.

The process of calculating acceleration in the vehicle simulator includes steps of: transmitting engine-related data from the ECU embedded system; calculating engine power using the engine-related data; calculating loss of engine power due to a road surface's condition; calculating actual engine power by using the engine power and the loss of engine power due to a road surface's condition; calculating the present acceleration of the vehicle by using the actual engine power and the vehicle's weight; and storing the calculated present acceleration.

The step of calculating the actual engine power "Fr" includes the step of calculating 'Fr=F−b' ("F" is engine power and "b" is loss of engine power).

The step of calculating the present acceleration comprises step of calculating 'A=F−b/m' ("F" is engine power, "b" is loss of engine power, and "m" is vehicle's mass).

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
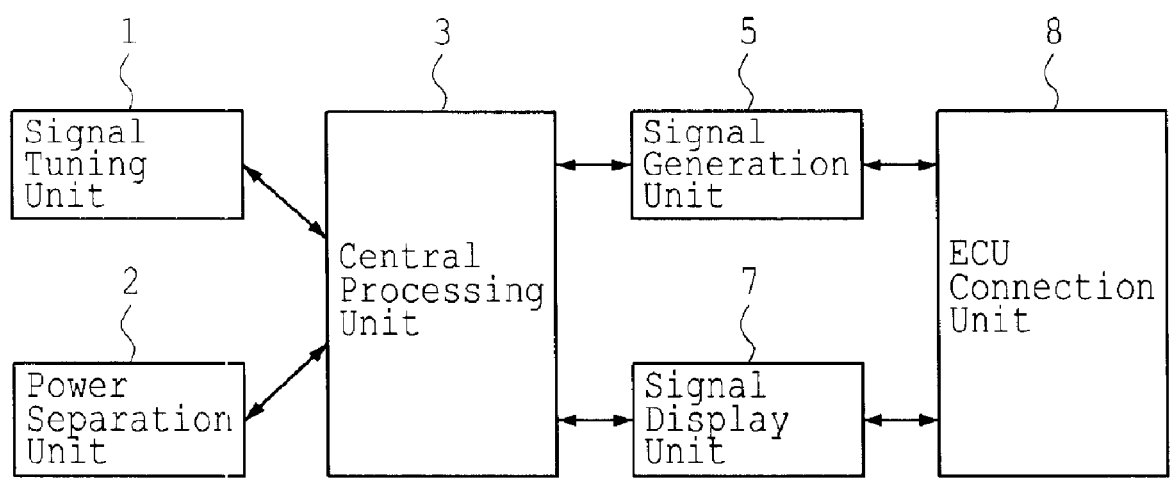
FIG. 1 is a block diagram illustrating a conventional simulator of a vehicle engine control apparatus.

Hereinafter, a preferred embodiment of the present invention will be described with reference to the accompanying drawings. In the following description and drawings, the same reference numerals are used to designate the same or similar components.

Figure 2:
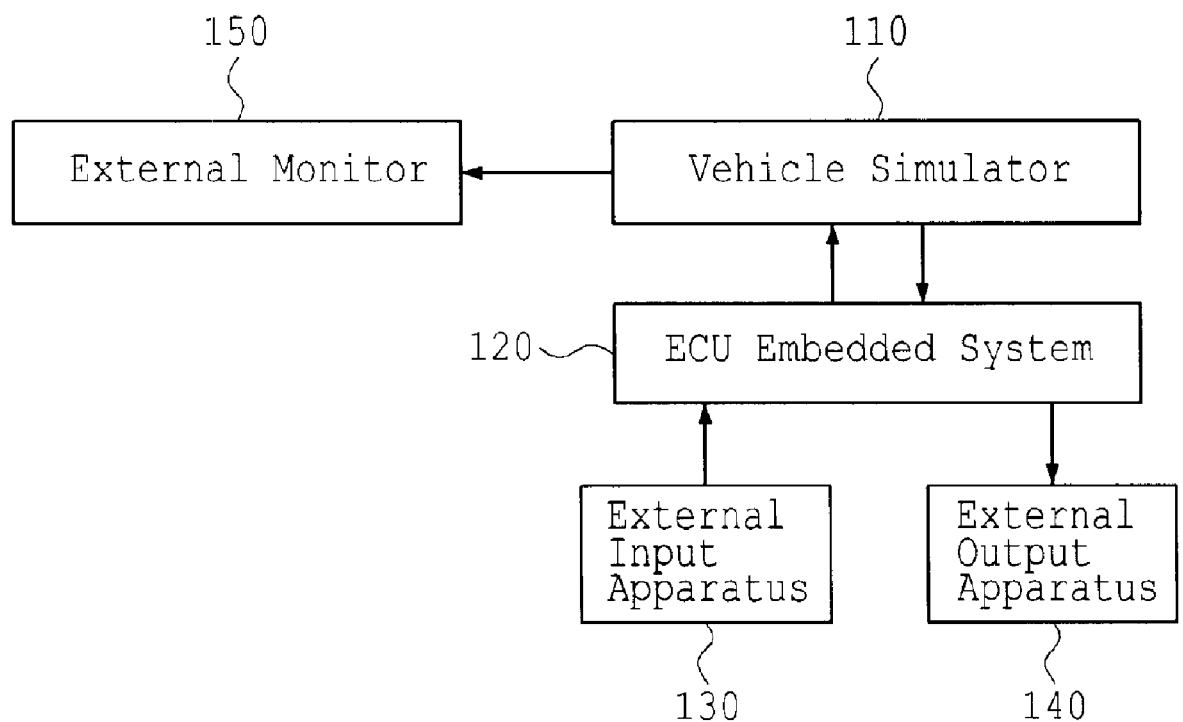
FIG. 2 is a block diagram illustrating a 3D vehicle simulator system for an ECU embedded system according to the present invention.
Figure 3:
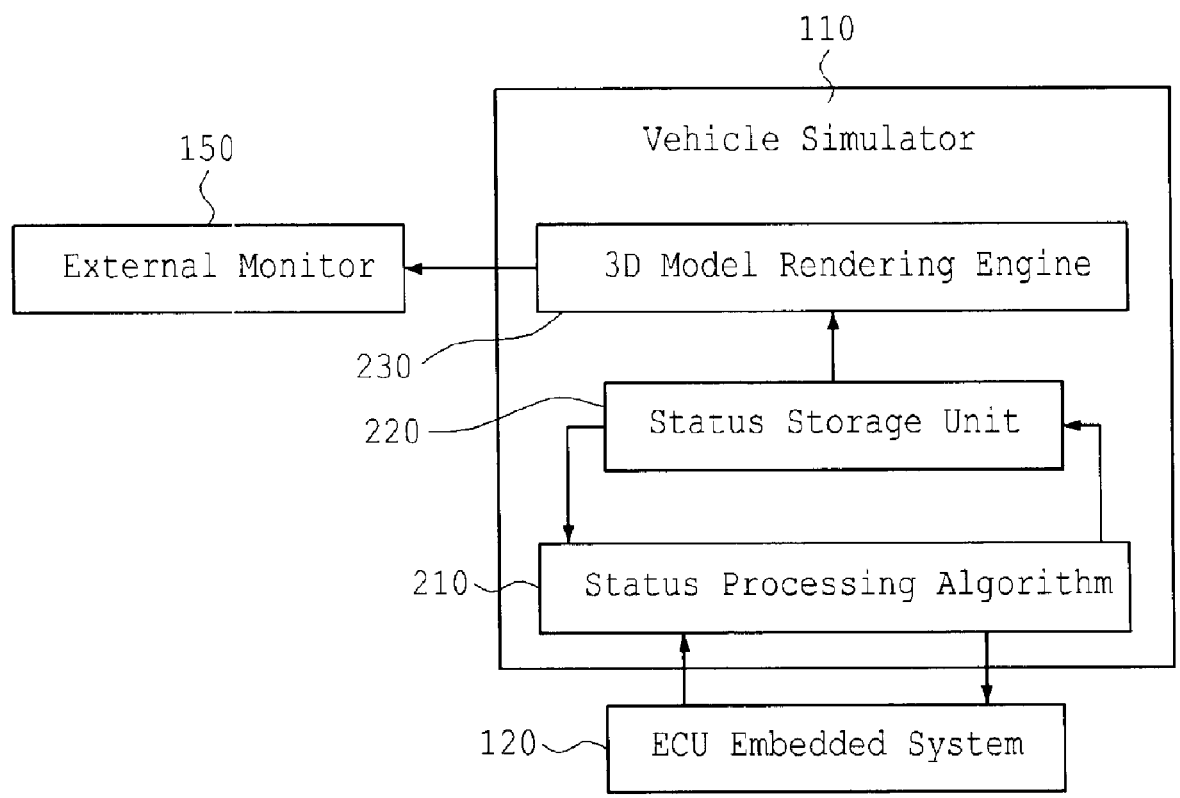
FIG. 3 is a block diagram illustrating a vehicle simulator employed in the present invention.
Figure 4:
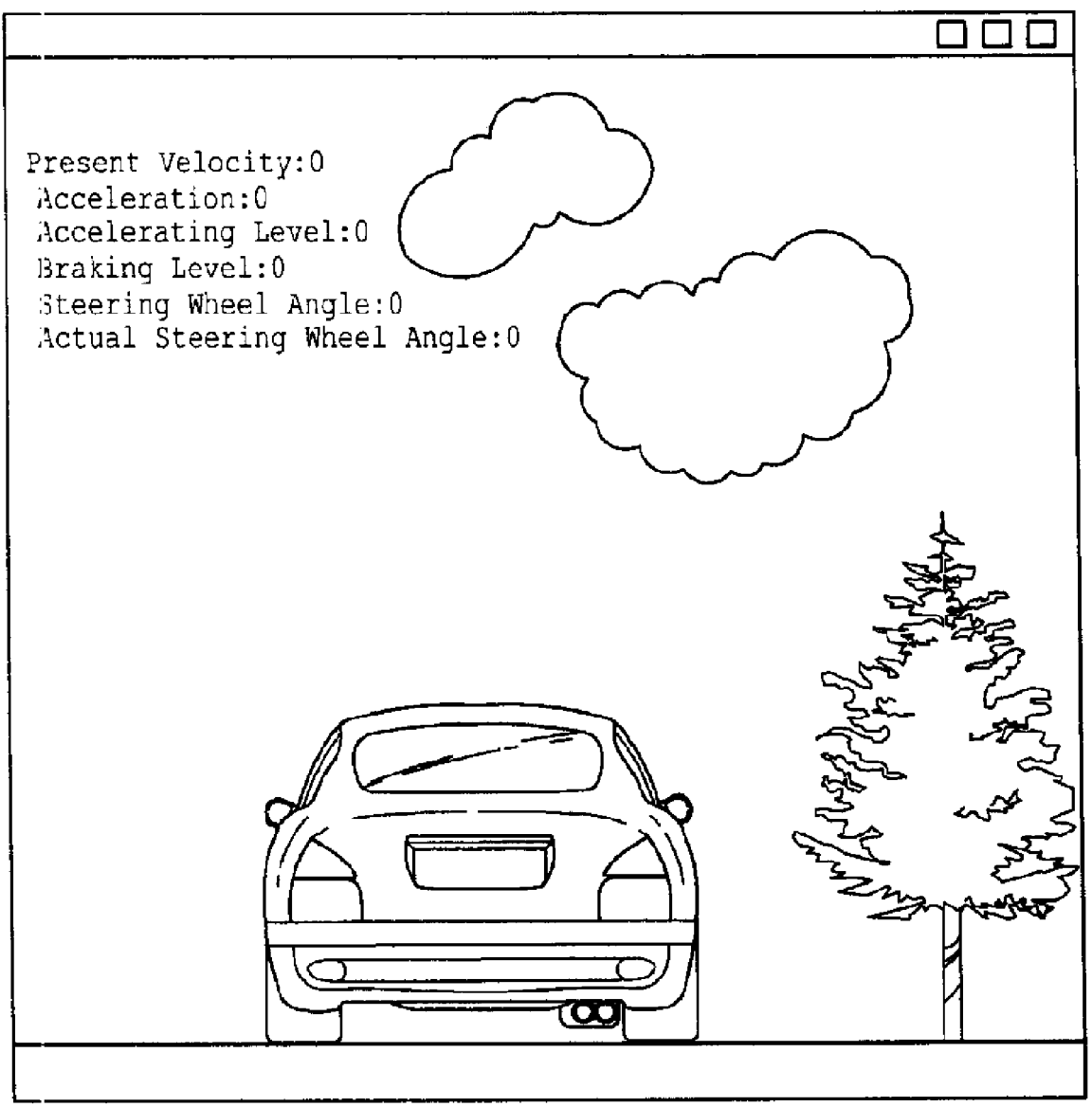
FIG. 4 is an exemplifying view illustrating an output of the inventive 3D vehicle simulator system in an initial stop status.
Figure 5:
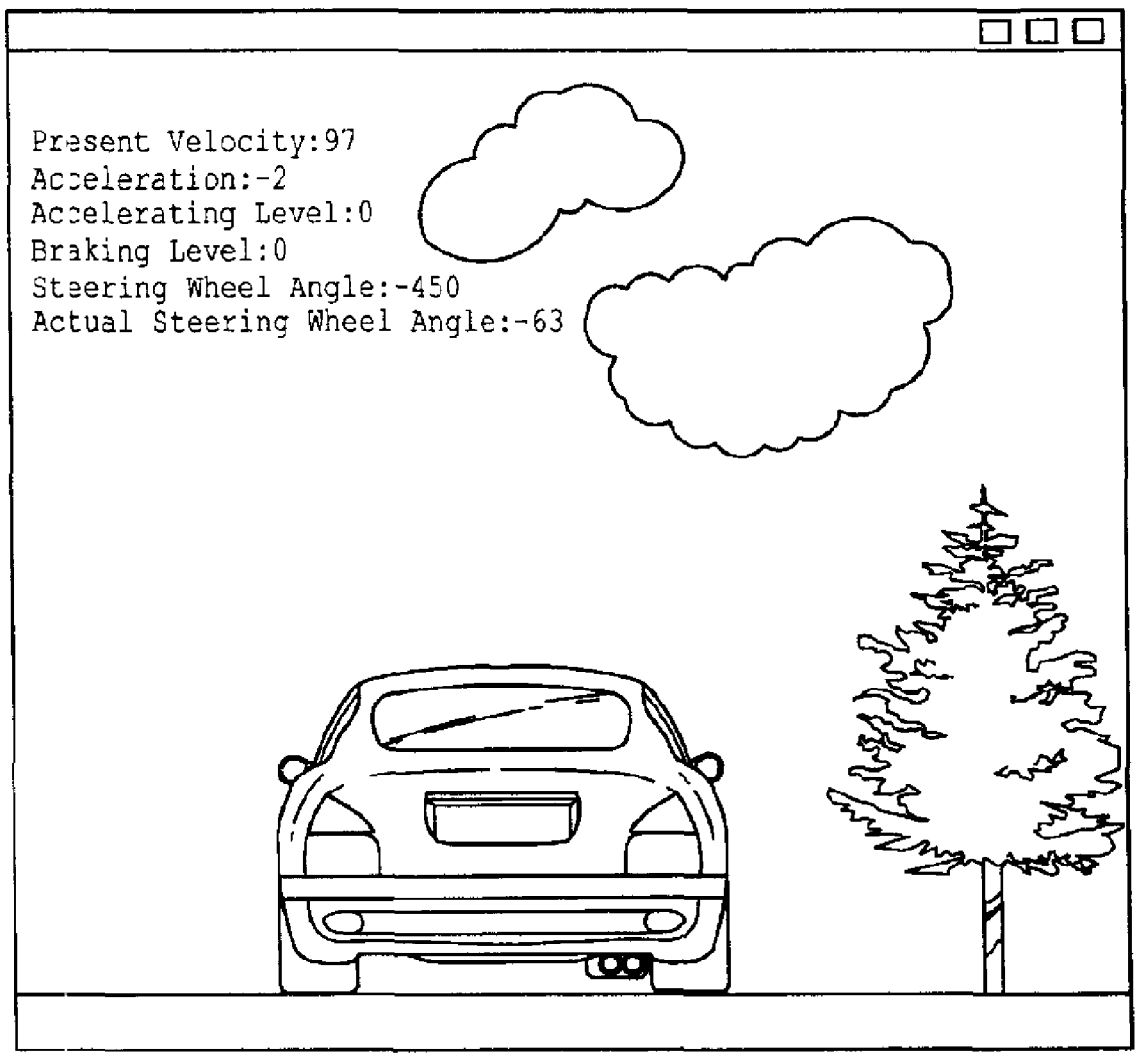
FIG. 5 is an exemplifying view illustrating an output of the inventive 3D vehicle simulator system, which is changed by an input value.
Figure 6:
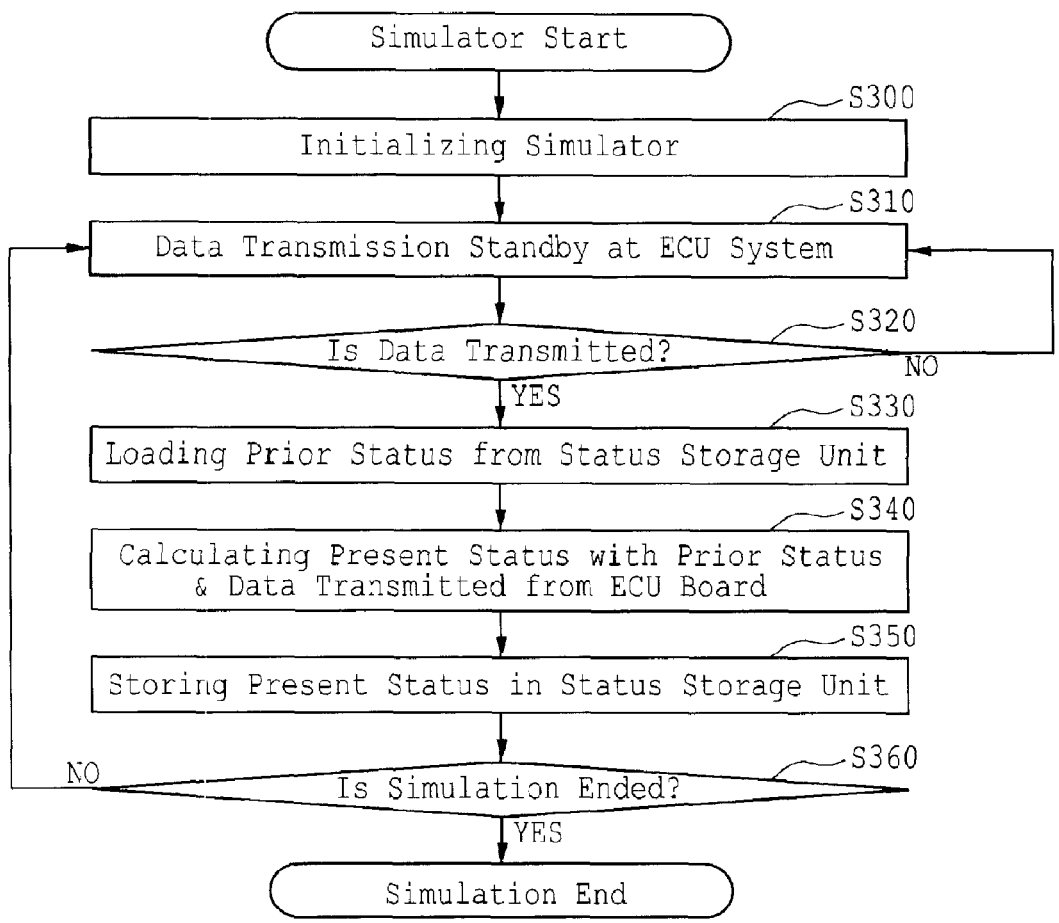
FIG. 6 is a program flowchart illustrating the executing procedure of the vehicle simulator employed in the present invention.
Figure 7:
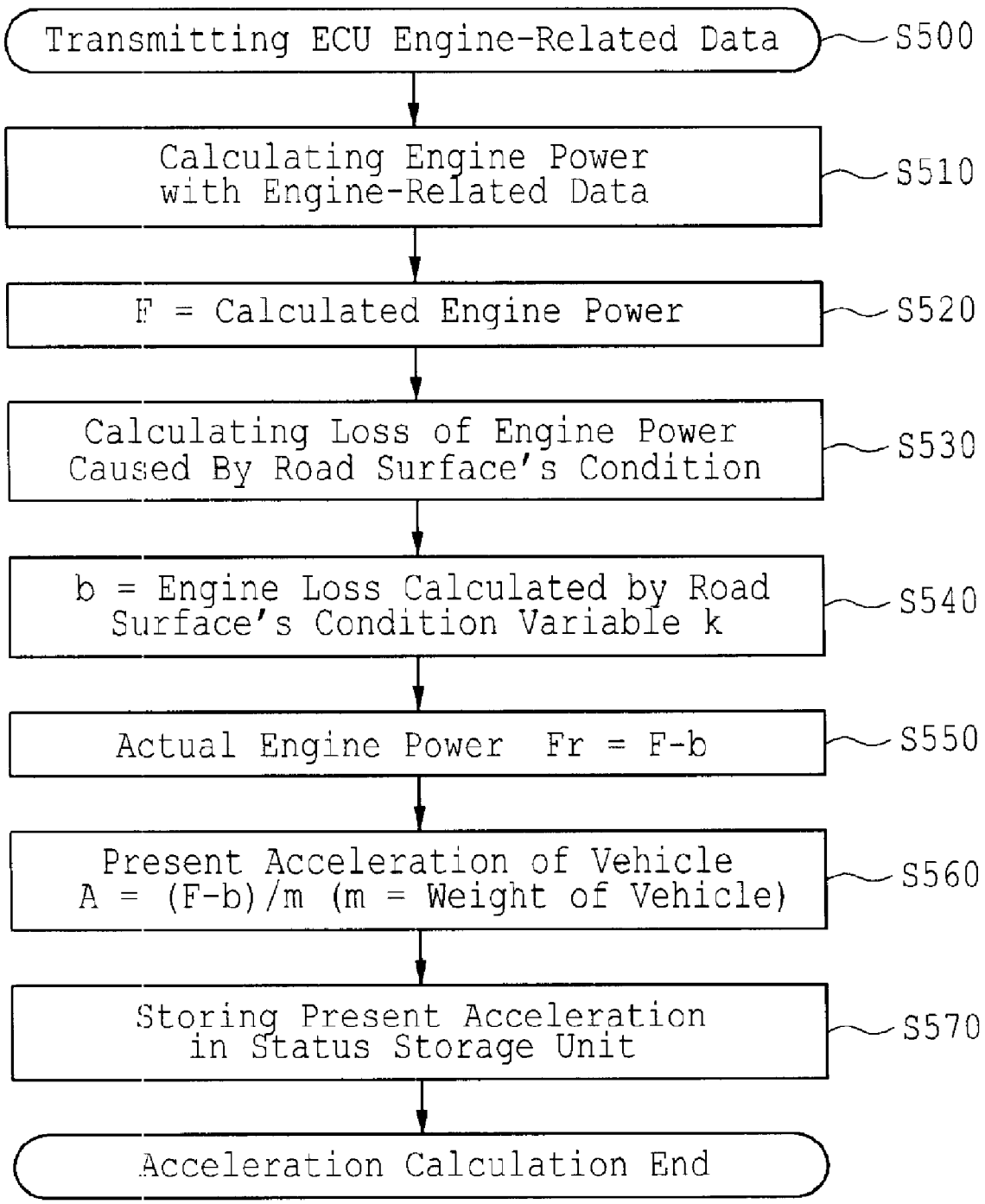
FIG. 7 is a program flowchart illustrating an example of calculating acceleration of a vehicle by using the vehicle simulator.

FIG. 2 is a block diagram illustrating a 3D vehicle simulator system for an ECU embedded system according to the present invention, and FIG. 3 is a block diagram illustrating a vehicle simulator employed in the present invention. FIG. 4 is an exemplifying view illustrating an output of the inventive 3D vehicle simulator system in an initial stop status, and FIG. 5 is an exemplifying view illustrating an output of the inventive 3D vehicle simulator system, which is changed by an input value.

As shown in FIGS. 2 and 3, the 3D vehicle simulator system for an ECU embedded system according to an embodiment of the present invention includes an external input apparatus 130; an ECU embedded system 120 for executing data transmission, processing or additional treatment by receiving signals outputted from the external input apparatus 130 so as to; an external output apparatus 140 for receiving output signals of the ECU embedded system 120 and outputting the signals through an additional apparatus; a vehicle simulator 110 for 3D-modeling the status of a vehicle by calculating at real time the signals transmitted from the ECU embedded system 120; and a display for outputting the 3D-modeled vehicle outputted from the vehicle simulator 110.

The ECU embedded system 120 employed in the present invention is an MPC 565 MCU (Micro Controller Unit) Model available from FreeScale.

The MPC 565 Model is a 32-bit microcontroller, wherein the ECU embedded system configured by the MPC Model can be controlled at any part of a vehicle.

The external input apparatus is configured by an ordinary sensor connected with the ECU embedded system. For example, for an engine, the sensor may be a sensor for detecting RPM (Revolutions Per Minute) of the engine or a sensor detecting the amount and pressure of intake air of the engine.

The external output apparatus 140 means one or more appliances for taking part in operations required for control when the ECU embedded system 120 conducts the operations required for control by using various input values inputted from the outside of the ECU embedded system 120.

For example, the ECU embedded system 120 determines the amount of injected fuel and the ignition timing in the engine on the basis of values from sensors related to the amount and pressure of intake air, the pressure of the accelerator, etc.

A fuel injection device and an ignition device, which the ECU embedded system 120 accesses so as to determine the injection amount of fuel and the ignition timing, are included in the external output apparatus.

In addition, various instrument panels and driving units, which can be visually confirmed, are also included in the external output apparatus.

Consequently, analogue sensor values such as pressure or temperature in the vehicle are turned into digital data through the ECU embedded system 120 and transmitted to other apparatus such as the external output apparatus 140.

The vehicle simulator 110 includes a status processing algorithm operation unit 210 for estimating the present status through an algorithm programmed to be suitable to a vehicle simulation model on the basis of information transmitted from the ECU embedded system 120, a status storage unit for storing present status information, prior status information, or data required for estimating next status information, and a 3D model rendering engine 230 for calculating in real time the present status information stored in the status storage unit 220 according to the status algorithm operation unit 210 so as to change and output the status of the vehicle in a 3D model.

If new data such as data of various sensors and the status of the vehicle are inputted to the vehicle simulator 110, the vehicle simulator 110 firstly loads the prior status information from the status storage unit 220.

In addition, the status processing algorithm operation unit 210 calculates the present status of the vehicle using the prior status information and the presently inputted new data.

For example, in order to calculate the turning angle of the vehicle, the status processing algorithm unit 210 calculates the accelerating direction and moving direction of the vehicle in the present status on the basis of the acceleration and moving direction of the vehicle in the prior status, the turning angles and present speed of the front wheels of the vehicle, which are new data inputted from the ECU embedded system 120, and other information for the vehicle.

In the event, because the status processing algorithm operation unit 210 contains information regarding a certain environment generated by the user, for example, information regarding the sloping angle, the moving property of wheels depending on the condition of a road surface, or the like, the present status becomes the test values for the certain environment.

The rendering engine 230 shows a three-dimensional object on a screen, which is the most basic among three-dimensional engines for representing a graphic on a screen.

The rendering engine 230 is well-known in the art and can be very easily made.

In the present invention, the rendering engine 230 is implemented by using the Direct X Version 9.0 fabricated by Microsoft.

The data displayed on the display 150 is data inputted to the vehicle simulator 110 through the ECU embedded system 120.

Therefore, if it is desired to simulate and observe the velocity of the vehicle, the turning angle of the front wheels, and the On/Off data of head lamps in a certain environment, the user transmits related data to the vehicle simulator 110 through the ECU embedded system 120 using communication protocol. If so, the vehicle simulator 110 receives the data and renders the data to be displayed on the display 150 through the status processing algorithm operation unit 210, the status storage unit 220, and the 3D model rendering engine 230.

In addition, parameter values required for controlling the vehicle are displayed on the display 150 in text.

For example, if it is desired to know the present acceleration and moving direction of the vehicle, the 3D model rendering engine 230 renders data related to the acceleration and moving direction to be displayed on the display 150.

Meanwhile, in data communication between the ECU embedded system 120 and the vehicle simulator 110, and data transmission from the ECU embedded system 120 to the external output device 140, the CAN (Controller Area Network) disclosed in Korean Unexamined Patent Publication No. 10-2005-0100412, the contents of which are hereby incorporated by reference, or the RS-232 network communication protocol disclosed in Korean Unexamined Patent Publication No. 10-2003-0086765, the contents of which are hereby incorporated by reference, can be employed.

The inventive 3D vehicle simulator system for an ECU embedded system configured as described above is operated in the following manner.

If the vehicle simulator 110 is executed, the vehicle simulator 110 transmits data to the ECU embedded system 120 by using the above-mentioned CAN or RS-232 network communication protocol, thereby initializing the ECU embedded system 120.

As shown in FIG. 4, the initialized status is outputted to the display 150, and the ECU embedded system 120 is ready to receive input signals (S310).

If signals of an external sensor which is included in the external input apparatus 130 are inputted to the ECU embedded system 120 (S320), the ECU embedded system 120 inputs the signals required to subject a simulation procedure to the vehicle simulator 110, in which a simulation program is being operated, using the CAN or RS-232 network communication protocol.

If new data is inputted to the vehicle simulator 110, the vehicle simulator 110 loads prior status information from the status storage unit 220 (S330).

The status processing algorithm operation unit 210 calculates the present status using the prior status information and the present new data (S340).

The present status calculated by the status processing algorithm is stored in the status storage unit 220 (S350), and the 3D model rendering engine 230 outputs the 3D model of the vehicle corresponding to the present status at real time using the present status inputted in the status storage unit 220.

The 3D model of the vehicle outputted from the 3D model rendering engine 230 is outputted in the presently proceeding status of the vehicle through the display 150, as shown in FIG. 5. At the left top of the display 150, certain data required by the user (for example, present velocity, acceleration, accelerating level, braking level, steering wheel angle, actual steering wheel angle, etc.) are outputted at real time, so that the variation of data can be continuously observed.

Referring to calculation of vehicle's acceleration by way of an example, if engine-related data is inputted to the vehicle simulator 110 from the ECU embedded system 120 (S500), the status processing algorithm operation unit 210 calculates engine power using the engine-related data (S510).

Assuming the calculated engine power is F (S520), the loss of the engine power caused by a variable k of a road surface's condition is calculated (S530).

Assuming loss of the engine power, which is calculated by using the variable of the road surface's condition, is b (S540), the actual engine power is calculated by equation 1 as follows (S550):

$$\text{Actual Engine Power } (Fr) = F - b \quad (1)$$

Therefore, the present acceleration of the vehicle can be calculated by equation 2 as follows (S560):

$$\text{Present Acceleration } (A) = (F-b)/m \text{ (herein, } m \text{ is the mass of the vehicle)} \quad (2)$$

The calculated present acceleration is stored in the status storage unit (S570).

The present acceleration stored in the status storage unit 220 is displayed on the display 150 as the acceleration data through the 3M model rendering engine 230.

In addition, if the user inputs the turning angle of the steering wheel to the ECU embedded system 120, the turning angle data for the turning angle is displayed on the display 150 as shown in FIG. 5, wherein the actual steering wheel angle data displayed below the turning angle data is a steering wheel angle actually applied when simulated turning is performed in a certain environment (information of moving property of wheels, sloping angle, or the like) and the status of the vehicle calculated by the status processing algorithm operation unit 210.

Meanwhile, signals to be outputted to the external output apparatus 140 through the ECU embedded system 120 after having undergone the vehicle simulation procedure are retransmitted to the ECU embedded system 120 by using the CAN or RS-232 network communication protocol, and the ECU embedded system 120 suitably processes the signals and transmits the signals to the external output apparatus 140 by using the CAN or RS-232 network communication protocol.

According to the present invention, it is possible to judge the stability and suitability of an ECU embedded system using a 3D vehicle simulator system.

In addition, under circumstances in which an actual test cannot be performed, it is possible to configure a virtual test environment with a simulation model so as to analyze the reaction of the ECU embedded system, whereby the limit of the system can be found by using the analysis result.

Although the present invention has been described above in relation to specific embodiments for illustrative purposes, those skilled in the art will appreciate that various modifications, additions and substitutions are possible, without departing from the scope and spirit of the invention as disclosed in the accompanying claims.

What is claimed:

1. A 3D vehicle simulator system for an electronic control unit (ECU) embedded system comprising:
    an external input apparatus, to which signals of one or more external sensors are inputted;
    an ECU embedded system coupled to the external input apparatus for processing and executing signals inputted from the external input apparatus;
    an external output apparatus coupled to the ECU embedded system for receiving and outputting the output signals of the ECU embedded system;
    a vehicle simulator coupled to the ECU embedded system for calculating motion of a simulated vehicle in real time using the output signals from the ECU embedded system, and for 3D-modeling and outputting the status of the simulated vehicle; and
    a display coupled to the vehicle simulator for displaying the 3D-modeled vehicle outputted from the vehicle simulator.

2. A 3D vehicle simulator system as claimed in claim 1, wherein the ECU embedded system 120 comprises at least a 32-bit microcontroller unit.

3. A 3D vehicle simulator system as claimed in claim 1, wherein the vehicle simulator comprises:
    a status processing algorithm operation unit for estimating the present status through an algorithm programmed to be suitable for a vehicle simulation model by inputting signals outputted from the ECU embedded system;
    a status storage unit for storing the present status and the prior status which have passed the status processing algorithm unit, and data required for estimating the next status; and
    a 3D model rendering engine for receiving the present status stored in the status storage unit, and for outputting a 3D model.

4. A 3D vehicle simulator system as claimed in claim 1, wherein CAN (Controller Area Network) network communication protocol is used for communicating signals between the ECU embedded system and the vehicle simulator, and for transmitting signals from the ECU embedded system 120 to the external output apparatus.

5. A 3D vehicle simulator system as claimed in claim 1, wherein RS-232 network communication protocol is used for communicating signals between the ECU embedded system and the vehicle simulator, and for transmitting signals from the ECU embedded system to the external output apparatus.

6. A 3D vehicle simulator system as claimed in claim 1, wherein at least one presentation of data is displayed in real time on the display.

7. A 3D vehicle simulator system as claimed in claim 3, wherein assuming that the engine power calculated by the status processing algorithm unit is F and the loss of engine power caused by a variable of a road surface's condition is "b", the actual engine power Fr by the status processing algorithm unit is calculated as F−b in the vehicle simulator 110.

8. A 3D vehicle simulator system as claimed in claim 3, wherein assuming that the weight of the vehicle is m, the present acceleration A calculated by the status processing algorithm unit is calculated as F−b/m in the vehicle simulator.

9. A 3D vehicle simulation method for an electronic control unit (ECU) embedded system comprising:
    initializing a vehicle simulator;
    transmitting data from an external input apparatus to an ECU embedded system;
    transmitting data from the ECU embedded system to an external output apparatus;
    loading a prior status of a simulated vehicle from a status storage unit in the simulator;
    calculating the present status of the simulated vehicle, the calculation being performed by a status processing algorithm operation unit in the vehicle simulator by using the prior status and the data transmitted from the ECU embedded system;
    storing the present status calculated by the status algorithm operation unit in the status storage unit;
    outputting the vehicle of the present status in a 3D model, the outputting of the 3D model being performed by a 3D model rendering engine in the vehicle simulator by using the present status stored in the status storage unit; and
    displaying the 3D model vehicle on a display.

10. A method as claimed in claim 9, further comprising retransmitting signals to be outputted to the external output apparatus after subjecting a simulation procedure in the vehicle simulator to the ECU embedded system.

11. A method as claimed in claim 9, wherein the process of calculating acceleration in the vehicle simulator comprises:
    transmitting engine-related data from the ECU embedded system;
    calculating engine power using the engine-related data;
    calculating loss of engine power due to a road surface's condition;
    calculating actual engine power by using the engine power and the loss of engine power due to the road surface's condition;
    calculating the present acceleration of the vehicle by using the actual engine power and the vehicle's weight; and
    storing the calculated present acceleration.

12. A method as claimed in claim 11, wherein the step of calculating the actual engine power Fr comprises the step of calculating $Fr=F-b$, wherein F is engine power and b is loss of engine power.

13. A method as claimed in claim 11, wherein the step of calculating the present acceleration comprises step of calculating $A=F-b/m$, wherein F is engine power, b is loss of engine power, and m is the vehicle's mass.

* * * * *